(12) United States Patent  
Bauchspies

(10) Patent No.: US 9,361,439 B1  
(45) Date of Patent: Jun. 7, 2016

(54) VIRTUAL VERIFICATION

(71) Applicant: Roger Allen Bauchspies, Ukiah, CA (US)

(72) Inventor: Roger Allen Bauchspies, Ukiah, CA (US)

( * ) Notice: Subject to any disclaimer, the term of this patent is extended or adjusted under 35 U.S.C. 154(b) by 53 days.

(21) Appl. No.: 14/012,115

(22) Filed: Aug. 28, 2013

Related U.S. Application Data

(60) Provisional application No. 61/709,864, filed on Oct. 4, 2012.

(51) Int. Cl.
*H04L 29/00* (2006.01)
*G06F 21/31* (2013.01)

(52) U.S. Cl.
CPC .................................... *G06F 21/31* (2013.01)

(58) Field of Classification Search
CPC .................................................. G06F 21/31
USPC ................................................................ 726/4
See application file for complete search history.

(56) References Cited

U.S. PATENT DOCUMENTS

| | | | |
|---|---|---|---|
| 8,185,646 B2 * | 5/2012 | Headley | 709/229 |
| 8,473,748 B2 * | 6/2013 | Sampas | 713/186 |
| 8,601,058 B2 * | 12/2013 | Ahmad et al. | 709/204 |
| 9,100,400 B2 | 8/2015 | Lunt | |
| 9,135,294 B2 | 9/2015 | Ghosh et al. | |
| 2009/0045257 A1 * | 2/2009 | Maus | 235/382 |
| 2012/0129596 A1 * | 5/2012 | Thackston | 463/29 |

* cited by examiner

*Primary Examiner* — Jeffrey Pwu
*Assistant Examiner* — Michael D Anderson
(74) *Attorney, Agent, or Firm* — Patent Law Offices of Michael E. Woods; Michael E. Woods

(57) ABSTRACT

An automatic machine implemented identification and data processing, gathering and storage system and method. A system, method and computer program product for communicating peer-validated reputation information enabling users, including automated processing equipment and methods, to, among other things, make decisions of safe or unsafe personal interactions, such as participating in an in-person meeting.

46 Claims, 3 Drawing Sheets

VIRTUAL VERIFICATION

CROSS REFERENCE TO RELATED APPLICATIONS

This application claims benefit of U.S. 61/709,864 filed 4 Oct. 2012, the contents of which are hereby expressly incorporated by reference thereto in its entirety for all purposes.

FIELD OF THE INVENTION

The present invention relates generally to automatic machine implemented identification and data processing, gathering and storage systems, and more specifically, but not exclusively, to a system, method and computer program product for communicating identification information enabling users, including automated processing equipment and methods, to, among other things, make decisions of safe or unsafe personal interactions.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The Internet and other online mechanisms have enabled creation of online virtual identities and pseudonyms. There are many services and tools that provide online communities where netizens (a term for citizens of these virtual spaces) meet and interact. Sometimes these meetings and interactions lead to meetings and real-world interactions. The individuals involved do not necessarily have verifiable information regarding the other person(s).

Part of the reason that this is true is because it is very easy for individuals to create and shed virtual identities. Some systems anchor an identity to some other reference, like an e-mail address. However these e-mail addresses are very easy to proliferate and obtain and shed, making such anchors less valuable for contexts that desire greater verification.

There are many situations where a user would like an increased level of user verification. Even in cases where there is an online reputation system, those systems may be compromised and artificially skewed in one direction or another. Online dating that develops into a real-world meeting, or a commerce site where parties meet to exchange real-world items are particularly well-known examples where the parties are advantaged by having some sense that a person that they are meeting is, in fact, the virtual entity and/or that the online reputation information that was used in developing a decision about interacting with the person represented by the virtual identification is authentic.

There have been conventional approaches to obtaining user identification (e.g., fingerprint(s)) using portable computing platforms. However these systems have required that special fingerprint image scanners be installed into these platforms. The extra cost and limited function are deterrents to adoption of remote ID verification, and the inability to have effective and robust remote ID verification have limited development of systems that rely on collection/use of such information. Many portable computing embodied in smartphones, tablets and the like having cameras, yet these cameras are typically viewed as insufficient to function as fingerprint imagers sufficient for use in identification.

What is needed is a system and method for relating information to individuals prior to, during and after interactions, e.g., in-person meetings initiated through on-line virtual introductions or other introductions of previously unknown individuals, to enable confidence related to the security of a transaction, e.g., personal safety of all parties to a face-to-face encounter.

BRIEF SUMMARY OF THE INVENTION

Disclosed is a system and method for relating information to individuals prior to, during and after interactions, e.g., in-person meetings initiated through on-line virtual introductions or other introductions of previously unknown individuals, to enable confidence related to the security of a transaction, e.g., personal safety of all parties to a face-to-face encounter. Additionally it introduces tools to facilitate an in-person secure meeting and enables a tracking path to the physical identity of a person should an unwanted act or need arise based upon prior history in-person meetings and virtual information and the use of biometric and social information gathering. This system enables a verifiable virtual ID that may or may not link directly to an actual person through information provided by the user but does represent an actual person with a verifiable ID and confirmed in conjunction with both physical location and social interactions.

The following summary of the invention is provided to facilitate an understanding of some of technical features related to secure introduction/virtual identification verification, and is not intended to be a full description of the present invention. A full appreciation of the various aspects of the invention can be gained by taking the entire specification, claims, drawings, and abstract as a whole. The present invention is applicable to other methods and processes including those that rely on a reputation or identification verification.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

For public use, especially for daily interactions initiated within on-line and virtual communities, some embodiments provide a system that offers a degree of anonymity and privacy while simultaneously protecting against unwanted actions prior to, during and after an in-person meeting without inhibiting the actual meeting. Such a system should provide information relevant to the person(s) being met prior to the in-person meeting for the purpose of avoidance when possible, the system should oversee the actual meeting to alert upon unwanted actions and follow up with a post meeting confirmation of user safety.

In the event of an unwanted activity related to an in-person meeting, the system may include a mechanism of tracking and identifying the perpetrator to prevent further misconduct.

Furthermore, the system should retain knowledge of any misconduct to prevent future interactions related to the offense exhibited while also offering a record of positive interactions.

Protecting an individual's safety and privacy can be a primary goal of some such systems. Building a virtual system of anonymous encounters should also be bases of both determining a confidence factor based upon secondary contacts for the user and offer a degree of confirmation against false accusations.

While a range of biometric information may be used by different embodiments, fingerprints are a well-known class of biometric data. It is possible to control camera and device parameters of an iPhone (or other smartphone), iPad (or other tablet computer), and computing systems with built-in imagers to capture a sufficient image with enough contrast to extract useable information including control of uniform sizing/scaling as well as automatic control of contrast (e.g., camera illumination systems and the like). Issued patents of the inventor concerning fingerprinting are expressly incorporated herein in their entireties by reference thereto. These patents include U.S. Pat. Nos. 7,643,660, 7,512,256, 7,697,773, and 7,970,186.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for relating information to individuals prior to, during and after interactions, e.g., in-person meetings initiated through on-line virtual introductions or other introductions of previously unknown individuals, to enable confidence related to the security of a transaction, e.g., personal safety of all parties to a face-to-face encounter. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
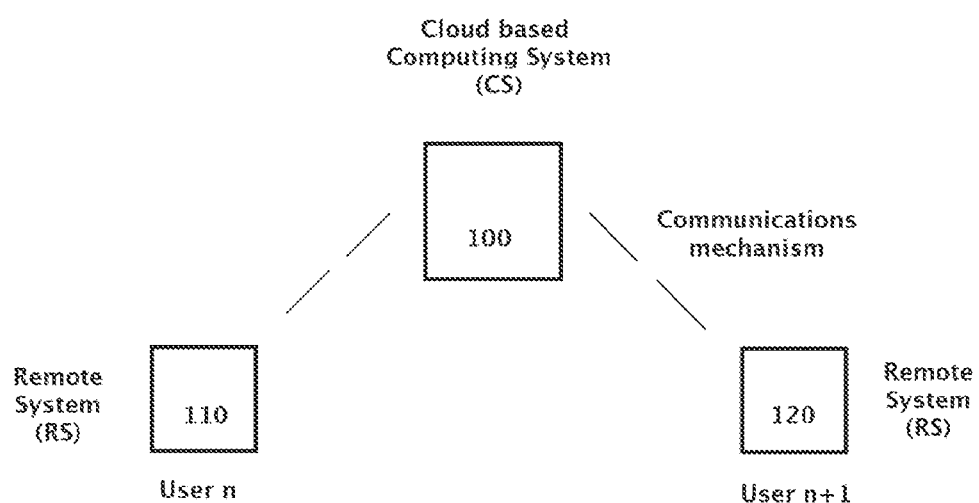
FIG. 1 illustrates a 'cloud' based computing system and individual user operated remote computing systems connected either wirelessly or by means of a physical connection to the 'cloud' based computer system.

FIG. 1 illustrates a 'cloud' based computing system (CS) (100) and individual user operated remote computing systems (RS) (110 & 120) connected either wirelessly or by means of a physical connection to the 'cloud' based computer system. Users exchange data between the RS (110), the CS (100) and other RS (120). The CS consists of a computer used to store data and communicate with individual RS units. The connection methods of wireless or physical wire is of common components in use. The RS consist of computing devices generally hand held of the designation smart phones, portable computers, any commonly available or specially prepared device having the ability to communicate with the CS.

Information stored on the CS may contain biometric data, location data such as GPS information and a reference to the user id such as a screen name or passkey. The RS devices may contain data from the CS related to the in-person matching of biometric data and any data related to facilitating a virtual verification of ID or to facilitate an in-person meeting.

Figure 2:
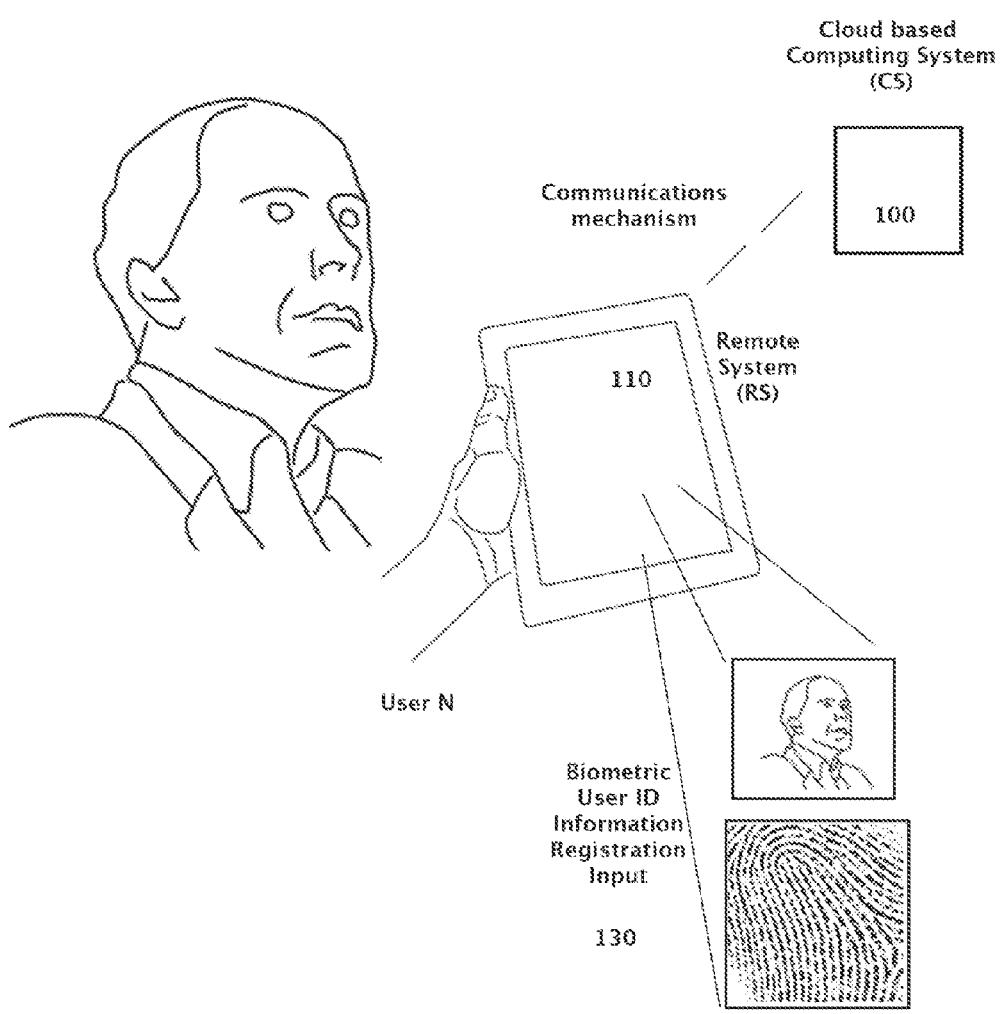
FIG. 2 illustrates a collection of data as used in a 'registration' process.

FIG. 2 illustrates the collection of data as used in a 'registration' process. Biometric information is collected at the RS at 110 and sent to the CS at 100 by means of the communications mechanism. Actual data collected may contain any or all of relevant information such as biometric data associated with User N.

Figure 3:
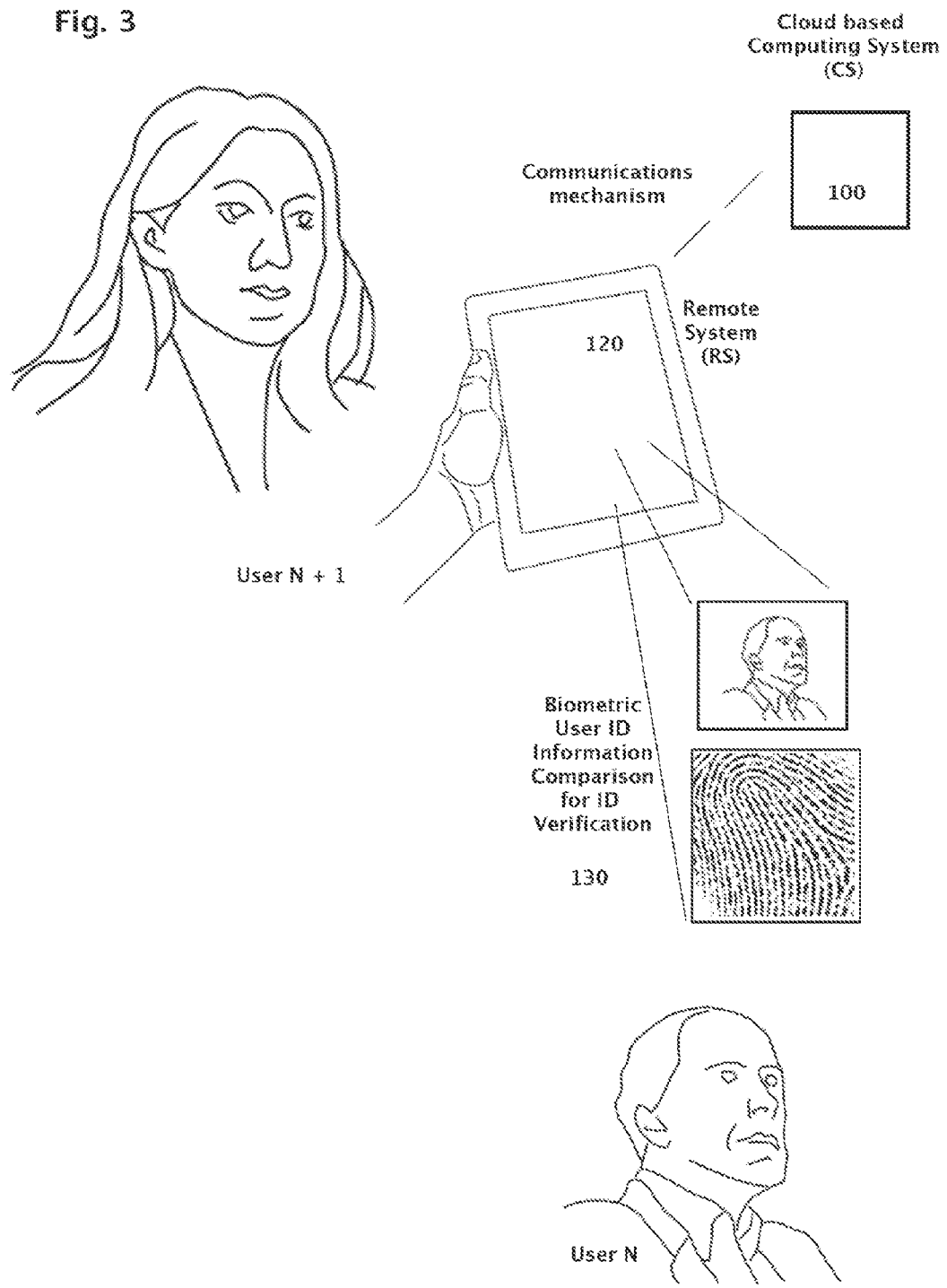
FIG. 3 illustrates the in-person meeting and the confirmation of the ID of another user.

FIG. 3 illustrates the in-person meeting and the confirmation of the ID of another user. Data stored on the CS 100 is transmitted to the RS 120 for use. The ID confirmation is performed on the RS at 120 using data (130) supplied from the CS at 100.

Operation is initiated by a user at RS 110. An RS can have any or all of the following capabilities: GPS receiver to record location, a camera for video or still image, biometric data sensor, microphone for audio/voice inputs, motion sensors, speaker and screen for data display. A user enters registration data 130 by means of a software program that consists of a reference identifier (screen name), (optional personal information consisting of legal name and address), biometric data as per the device capabilities. Data 130 is then transmitted to the CS (100) for storage and may or may not be stored at the RS 110.

Upon the initiation of an in-person meeting, the virtual data 130 of User N is transmitted to User N+1 at RS 120 from the CS at 100. User N+1 oversees a biometric or other ID verification process at RS 120 for confirmation against fraud or abuse. For example, if a fingerprint ID is performed, User N+1 observes at RS 120 that User N under test is submitting a real finger for analysis rather than a photo or representation of a finger for data input to be compared with the data 130 of User N. Multiple biometric inputs may be used.

The data 130 either agrees or disagrees with the ID verification of User N under test at the RS 120. User N+1 has personally confirmed the validity of the ID verification process at RS 120 of user N under test to the data 130 of User N.

Additional background: The methods of introductions leading to in person meeting of new persons has changed significantly. We meet 'virtually' through internet based services. Crimes at the point of in person meeting through these virtual meetings are increasing. Misrepresentations of persons met through virtual meetings are wide spread. Crimes from virtual services related to hailing a cab, buying or selling through classified advertisements, dating services, ordering a pizza or business meeting introductions have created a system of uncertainty regarding the person(s) being met. Societal distrust who we are meeting. Societally we are asking ourselves if we are safe upon a meeting from unknown individuals. Societally we are asking if the person we are meeting is really who they say they are. Societally we are using mobile devices to assist in meeting the people we are cautious of.

Summary: A system for a verifiable virtual ID that may or may not link directly to an actual person through provided information but does represent an actual person with a verifiable ID. A system for tracking location of a virtual ID to offer a confirmation of ID associated with physical location. A system for confirming ID of person prior to in-person meeting.

Overview: Voluntary system that offers protection to all parties in for in-person meeting. (Improves personal safety before, during and after meeting). Assists in locating in-person meeting participants. May be used to keep true identities private. Users surrender some anonymity to gain greater personal safety, security and peace of mind. Viral information gathering based upon information gathered from repeated use of system to build a history. Offers background information based upon past experience based upon previous user experiences. The more a user employs this technology, the more confidence of the user's viability. In person meeting may use biometric methods to confirm ID of any/all present. Use of Biometric offers higher degree of confidence. Pre-meeting information revealed allows all parties to understand and evaluate the wisdom of in-person meeting based upon prior histories. Actual identity can be preserved with regard to information displayed to other users. Even User Data Records of the technology need not know the true user identity. Therefore, Virtual ID. Virtual ID uses ID by association, the web work of connections between other connected users. System emphasis is Verification as opposed to Identification. User offers a means to confirm they are who they say they are. Biometric is spoof protected by having verification performed on recipients (Voucher's) device while being monitoring by the recipient user. Each user has one input into database. Each subsequent use builds confidence. Optional 'Vouch for a friend' registration/confirmation process prior to in-person use. Build a network of 'known' individuals which builds upon reputation of those vouching thus the voucher's quality is also rated as a similar metric as the user's. Verification is for any or all of the persons attending in-person meeting. Also used as the engine to make appointment securely. Only with qualified biometrics will the appointment be made. Eliminates theft opportunity. For example, OnLine Classified, when a person responds to an advertisement, we can use the technology to require a verified ID prior to and during connecting buyer and seller. Otherwise, the 'potential buyer' may be calling to determine when the seller is not at home for the purpose of committing a crime. Other On-Line web service sites may utilize the technology through an API for the purpose of knowing the user is real vs. fraudulent or creating multiple screen names for deceit. It may also be used by third parties for the virtual verification service. API for third party integration.

Biometrics can include but are not limited to: fingerprint—prefer 6 fingers or more digit registration, finger position used (ex. Index, Middle, Ring on each of Left and Right Hands); palm print, voice print, face recognition—system verified (Face Recognition—User verified through display of photo), and DNA matching.

Fingerprint biometric: Technique to capture fingerprint without dedicated/specialized fingerprint sensors. Use common camera sensor for input. Enabled by method of processing. Includes method of resizing for uniformity.

Registration by inputting biometric data, name, use GPS location services. Registration information is transmitted to the cloud. Registration information is compared against database of users to insure no duplication or misrepresentation. User is only allocated one account although multiple 'screen identities' are possible each enabling differing levels of personal information presented. Ex: Use of full name for business meetings vs. use of indirect reference for virtual obscurity. If ID fail, users should not proceed from safe location. Biometric within database can be cross matched to verify user is only registered once. Post meeting, if a 'problem' is found with the meeting, a history of locations, biometric data and times can be forwarded to law enforcement. Meeting location tracking both to and from meeting destination, stored remotely in cloud.

Three stages: Pre-Meeting, Meeting and Post Meeting features. Audio may be monitored for distress signals. Forward information to 'friend' to enable real time tracking of user. Voice or alternative confirmation of 'safe' signal at prescribed intervals. Pre-planned route to insure travel plans. Verify safe conclusion/return. User A Biometric is verified on User B device using information previously submitted by User A. Results in assurance against tampering or fraudulent misrepresentation. Upon meeting, User B has User A biometric (matching or non-matching of expected information) and is transmitted to cloud if non matching. Viral aspect of the more the technology is used, the stronger the database becomes. Intimidation factor significant to insure against improper action of either user. Users will realize importance of self-conduct to insure continued good standing. Users will realize information can be used against themselves in the event of misconduct. Actual verification can occur either on device, in cloud or both. Credibility of User A & User B is established by histories, recorded, displayed to prospective users prior to establishing meeting.

Pre meeting, User A can view history of experiences from past experiences of users meeting User B. Aid in facilitating in-person meeting between Users through location services for in-person meeting (close range for protection). Aid in tracking down deceptive User with biometric information such as photo for recognition if a problem has arisen. Encourages all users to conduct themselves appropriately. Post meeting, User A can rate User B with +1,0,−1 rating without details. If a user maliciously rates another user, it will reflect on the one making the rating. Ratings go both ways to inform other users.

In-Person Meeting captures Biometric for confirmation and/or later use of ID. In-Person Meeting compares Biometric for ID confirmation. In-Person Meeting events may be captured. In-Person Meeting location events may be recorded. "Watch over" meeting for security. In-Person Meeting information stored in cloud. In-Person Meeting progress can be monitored by email, text message, voice, phone call and other using 'safe response' to insure safety. In-Person Meeting progress may be transmitted to 'friend' for remote observation/supervision. In-Person Meeting may trigger law enforcement follow up for 'issues'. In-Person Meeting progress may be triggered by preset configuration parameters for time interval, In-Person method of contact, safe words or passkeys.

Use of biometrics for safe words or actions may employ unique identifiers such as angle of rotation to device, alternative hidden means of inputting passkeys or standard passwords as safe phrases or 'send help' signals. All non-match biometrics can be stored on cloud system for post processing related to tracking, analysis and matching to strengthen database and aid tracking of non-compliant users. Use of Biometric is automatically transmitted to cloud as indication of actual use even if user does not provide feedback of experience. This is an indication of use either confirmed or non-confirmed and has significance with regard to validating user is who they say they are. Post meeting, confirm return to 'home'. Pre through Post meeting, confirm path along pre-described route. Map meeting path pre meeting. Map actual meeting path, store in cloud.

Optional features: Real physical address verification. Tie to location service for confirmation. Back ground check for personal confirmation. Anti-stalking protection. Post meeting follow through. Alibi for location, time, presence/location. "Parolee monitoring" by confirming physical presence/location on random or prescribed intervals. For location alibi confirmation, capture a photo of User, User submitting to biometric input, and background scene for anti-spoof additions. With every use consisting of the act of confirming biometrics of User A on User B's remote device is a confirmation of User A having been observed by User B at the location recorded by GPS. The credibility of User B is confirmation of User A's verification against spoofing the system. Histories of User A and User B will be recorded resulting in continued history building. This is a virtual ID, all users build a history based upon all the persons they interact with as either 'vouching' or being ID confirmed with a time, date and location stamp.

Leads to a concept of 7 degrees of separation in a virtual space. All of this without the requirement of a User entering direct contact information. Virtual ID may have no direct information of any User, only a history of interactions, a rating based upon in-person interactions, and possible biometrics for confirming User to Virtual ID. The system builds a webbing of associations. Used to facilitate in-person meetings through safe in-person introductions using: Virtual ID prior to meeting and initial in-person; Location coordination of meeting destination pre meeting and meeting time; Assist locating other meeting participants only within a small distance of meeting destination at meeting time. Small distance insures against pre or post meeting stalking. Verify user safety before, during and post meeting even through the return home. Extends to all aspects of coordinating an in-person meeting regarding location, time and safety. Sequence of events may be used. If User A has User B perform repeated verifications, quality of ratings is downgraded.

Uses

Package/product delivery acceptance both prior to delivery and at delivery as confirmation; Hail a cab; Order a pizza; Dating situations for in person meeting and pre-meeting acceptance; Party/meeting invitations; Confirm attendance; Voter confirmation; Reservation confirmation; Banking; ID confirmation for personal or group in-person meetings; ID confirmation prior to meeting for personal or group in-person meetings; and Deterrent against crime or misconduct of in-person meetings or related interactions. Threat of information used negatively against offends will prevent misuse. Guards against misrepresentation of personal information, impostors or substitutes making appearance. Can be used to present an Alibi based upon location, time and confirmed presence by meeting with other persons.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

The invention claimed is:

1. A machine-implemented reputation verification system confirming a first online reputation associated with a first person to a second person, the first person associated with a first computer system and the second person associated with a second computer system different from the first computer system, comprising:
- a third computing system in data communication with the first computing system and in data communication with the second computer system, said third computing system including a database configured to access a first record of the first online reputation, said first record including a first unique virtual ID, and a first set of pre-stored user-specific characterizations associated with the first person, with said database configured to access said record responsive to said first unique virtual ID to access said first set of pre-stored user-specific characterizations; and
- wherein the second computer system includes a second-computer interface configured to receive a first in-person set of user-specific characterizations from a first person-under-test while under direct surveillance of the second person during a current in-person interaction between the first person and the second person; and
- wherein the second computer system is configured to access said first set of pre-stored user-specific characterizations for comparison with said first in-person set of user-specific characterizations; and
- wherein the second computer system automatically records remotely a first current interaction record including information regarding said current in-person interaction.

2. The system of claim 1 wherein said first current interaction record includes said first in-person set of user-specific characterizations of the first person.

3. The system of claim 2 wherein said first set of user-specific characterizations include biometric data.

4. The system of claim 3 wherein said biometric data includes one or more fingerprints of the first person.

5. The system of claim 1 wherein said first record further includes a first reputation history including data developed from one or more prior in-person interactions between the first person and each person of one or more third persons prior to said current in-person interaction; and
- wherein said second-computer interface is further configured to access said first reputation history during said current in-person interaction.

6. The system of claim 5 wherein said one or more in-person interactions of said first reputation history each include a prior quantitative reputation indicator and wherein said first current interaction record includes a first current quantitative reputation indicator from the second person recorded into said first reputation history.

7. The system of claim 1 further confirming a second online reputation of the second person to the first person wherein said database is further configured to access a second record of the second online reputation, said second record including a second unique virtual ID, and a second set of pre-stored user-specific characterizations associated with the second person, with said database configured to access said second record responsive to said second unique virtual ID to access said second set of pre-stored user-specific characterizations; and
- wherein the first computer system includes a first-computer interface configured to receive a second in-person set of user-specific characterizations from a second person-under-test while under direct surveillance of the first person during said current in-person interaction; and
- wherein the first computer system is configured to access said second set of pre-stored user-specific characterizations for comparison with said second in-person set of user-specific characterizations; and
- wherein the first computer system automatically records remotely a second current interaction record including information regarding said current in-person interaction.

8. The system of claim 7 wherein said first current interaction record includes said first in-person set of user-specific characterizations of the first person and wherein said second current interaction record includes said second in-person set of user-specific characterizations of the second person.

9. The system of claim 8 wherein said sets of user-specific characterizations each include biometric data.

10. The system of claim 9 wherein said biometric data includes one or more fingerprints of the first person and one or more fingerprints of the second person.

11. The system of claim 7 wherein said first record further includes a first reputation history including data developed from one or more prior in-person interactions between the first person and each person of one or more third persons prior to said current in-person interaction;
- wherein said second record further includes a second reputation history including data developed from one or more prior in-person interactions between the second person and each person of one or more third persons prior to said current in-person interaction;
- wherein said second-computer interface is further configured to access said first reputation history during said current in-person interaction; and
- wherein said first-computer interface is further configured to access said second reputation history during said current in-person interaction.

12. The system of claim 11 wherein said one or more in-person interactions of said first reputation history each include a prior quantitative reputation indicator, wherein said one or more in-person interactions of said second reputation history each include a prior quantitative reputation indicator, wherein said first current interaction record includes a first current quantitative reputation indicator from the second person recorded into said first reputation history, and wherein said second current interaction record includes a second current quantitative reputation indicator from the first person recorded into said second reputation history.

13. The system of claim 1 wherein the second computer system is configured to verify said first person-under-test as the first person when said first in-person set of user-specific characterizations matches said first set of pre-stored user-specific characterizations.

14. The system of claim 13 wherein said first set of user-specific characterizations includes a user-specific biometric.

15. The system of claim 13 wherein said first set of user-specific characterizations includes a first user-specific identification other than a user-specific biometric.

16. The system of claim 15 wherein said first user-specific identification other than a user-specific biometric includes a digital image of the first person.

17. The system of claim 1 wherein said first current interaction record includes a start time entry of an initiation of said current in-person meeting and an end time entry of a conclusion of said current in-person meeting.

18. The system of claim 7 wherein the second computer system is configured to verify said first person-under-test as the first person when said first in-person set of user-specific characterizations matches said first set of pre-stored user-specific characterizations, and wherein the first computer system is configured to verify said second person-under-test as the second person when said second in-person set of user-specific characterizations matches said second set of pre-stored user-specific characterizations.

19. The system of claim 18 wherein said first set of user-specific characterizations includes a first user-specific biometric from the first person and wherein said second set of user-specific characterizations includes a second user-specific biometric from the second person.

20. The system of claim 18 wherein said first set of user-specific characterizations include a first user-specific identification other than a first user-specific biometric from the first user, and wherein said second set of user-specific characterizations include a second user-specific identification other than a second user-specific biometric from the second user.

21. The system of claim 20 wherein said first user-specific identification includes a first digital image of the first person, and wherein said second user-specific identification includes a second digital image of the first person.

22. The system of claim 7 wherein said current interaction records each include a start time entry of an initiation of said current in-person meeting and an end time entry of a conclusion of said current in-person meeting.

23. A machine-implemented reputation verification method for a first person evaluating a first possibility of having an in-person interaction with a second person, comprising the steps of:
   a) obtaining, by the first person from the second person, a first unique virtual ID;
   b) accessing a remote computing system using said first unique virtual ID, said remote computing system including a database configured to access a first record of a first online reputation of the second person, said first record including said first unique virtual ID, a first set of pre-stored user-specific characterizations associated with the second person, and a first reputation history including a history of previous confirmed in-person interactions between the second person and each of one or more third-party persons, with said database configured to access said first record responsive to said first unique virtual ID to access said first reputation history; and
   c) presenting said first reputation history to the first person.

24. The reputation method of claim 23 for the second person evaluating a second possibility of having the in-person interaction with the first person, comprising:
   d) obtaining, by the second person from the first person, a second unique virtual ID;
   e) accessing said remote computing system using said second unique virtual ID, said database configured to access a second record of a second online reputation of the first person, said second record including said second unique virtual ID, a second set of pre-stored user-specific characterizations associated with the first person, and a second reputation history including a history of previous confirmed in-person interactions between the first person and each of one or more third-party persons, with said database configured to access said second record responsive to said second unique virtual ID to access said second reputation history; and
   f) presenting said second reputation history to the second person.

25. A machine-implemented monitoring method for a current in-person meeting between a first person having a first computing system and a second person, comprising:
   a) receiving, by the first person, a first unique virtual ID;
   b) obtaining, using the first computing system under surveillance of the first person, a first set of in-person characterizations from the second person;
   c) retrieving, from a remote computing system responsive to said first unique virtual ID, a first record associated with the second person, said first record including the first unique virtual ID and a first set of pre-stored user-specific characterizations associated with the second person;
   d) confirming an association of the second person to said first record responsive to an evaluation of said first set of in-person characterizations against said first set of pre-stored user-specific characterizations; and
   e) recording remotely and automatically a first current interaction record using the first computer system, said first current interaction record including information regarding said current in-person interaction.

26. The method of claim 25 wherein said first current interaction record includes said first in-person set of user-specific characterizations of the second person.

27. The method of claim 26 wherein said first set of user-specific characterizations include biometric data.

28. The method of claim 27 wherein said biometric data includes one or more fingerprints of the second person.

29. The method of claim 25 wherein said first record further includes a first reputation history including data developed from one or more prior in-person interactions between the second person and each person of one or more third persons prior to said current in-person interaction, further comprising:
   f) accessing, using the first computing system, said first reputation history by the first person during said current in-person interaction.

30. The method of claim 29 wherein said one or more in-person interactions of said first reputation history each include a prior quantitative reputation indicator and wherein said first current interaction record includes a first current quantitative reputation indicator from the first person recorded into said first reputation history.

31. The method of claim 25 wherein the second person has a second computing system, further comprising:
   f) receiving, by the second person, a second unique virtual ID;
   g) obtaining, using the second computing system under surveillance of the second person, a second set of in-person characterizations from the first person;
   h) retrieving, from said remote computing system responsive to said second unique virtual ID, a second record associated with the first person, said second record including the second unique virtual ID and a second set of pre-stored user-specific characterizations associated with the first person;
   i) confirming an association of the first person to said second record responsive to an evaluation of said second set of in-person characterizations against said second set of pre-stored user-specific characterizations; and
   j) recording remotely and automatically a second current interaction record using said second computing system, said second current interaction record including information regarding said current in-person interaction.

32. The method of claim 31 wherein said first current interaction record includes said first in-person set of user-specific characterizations of the second person and wherein said second current interaction record includes said second in-person set of user-specific characterizations of the first person.

33. The method of claim 32 wherein said sets of user-specific characterizations each include biometric data.

34. The method of claim 33 wherein said biometric data includes one or more fingerprints of the first person and one or more fingerprints of the second person.

35. The method of claim 31 wherein said first record further includes a first reputation history including data developed from one or more prior in-person interactions between the second person and each person of one or more third persons prior to said current in-person interaction, and wherein said second record further includes a second reputation history including data developed from one or more prior in-person interactions between the first person and each person of one or more third persons prior to said current in-person interaction, further comprising:
  k) accessing, using the first computing system, said first reputation history by the first person during said current in-person interaction; and
  l) accessing, using said second computing system, said second reputation history by the second person during said current in-person interaction.

36. The method of claim 35 wherein said one or more in-person interactions of said first reputation history each include a prior quantitative reputation indicator, and wherein said one or more in-person interactions of said second reputation history each include a prior quantitative reputation indicator, further comprising:
  m) recording a first current quantitative reputation indicator from the first person into said first reputation history as part of said first current interaction record; and
  n) recording a second current quantitative reputation indicator from the second person into said second reputation history as part of said second current interaction record.

37. The method of claim 25 further comprising:
  f) verifying said association of said second person to said first record when said first in-person set of user-specific characterizations matches said first set of pre-stored user-specific characterizations.

38. The method of claim 37 wherein said first set of user-specific characterizations includes a user-specific biometric.

39. The method of claim 37 wherein said first set of user-specific characterizations includes a first user-specific identification other than a user-specific biometric.

40. The method of claim 39 wherein said first user-specific identification other than a user-specific biometric includes a digital image of the second person.

41. The method of claim 25 wherein said first current interaction record includes a start time entry of an initiation of said current in-person meeting and an end time entry of a conclusion of said current in-person meeting.

42. The method of claim 31 further comprising:
  j) verifying said association of said second person to said first record when said first in-person set of user-specific characterizations matches said first set of pre-stored user-specific characterizations; and
  k) verifying said association of said first person to said second record when said second in-person set of user-specific characterizations matches said second set of pre-stored user-specific characterizations.

43. The method of claim 42 wherein said first set of user-specific characterizations includes a first user-specific biometric from the second person and wherein said second set of user-specific characterizations includes a second user-specific biometric from the first person.

44. The method of claim 42 wherein said first set of user-specific characterizations include a first user-specific identification other than a first user-specific biometric from the second person, and wherein said second set of user-specific characterizations include a second user-specific identification other than a second user-specific biometric from the second person.

45. The method of claim 44 wherein said first user-specific identification includes a first digital image of the second person, and wherein said second user-specific identification includes a second digital image of the first person.

46. The method of claim 31 wherein said current interaction records each include a start time entry of an initiation of said current in-person meeting and an end time entry of a conclusion of said current in-person meeting.

* * * * *